United States Patent [19]
Ono

[11] Patent Number: 5,910,208
[45] Date of Patent: Jun. 8, 1999

[54] BOILED RICE-SHAPING APPARATUS

[75] Inventor: Hiroshi Ono, Hachioji, Japan

[73] Assignee: Chiba and Associates, Tokyo, Japan

[21] Appl. No.: 09/179,396

[22] Filed: Oct. 27, 1998

[51] Int. Cl.[6] .............. A21C 3/06; A23C 9/00; A23P 1/00; A47J 43/20

[52] U.S. Cl. .............. 99/353; 99/428; 99/450.1; 99/485; 425/297; 425/308; 425/371

[58] Field of Search .............. 99/340, 352–355, 99/426, 428, 439, 441, 450.1, 450.2, 450.4, 450.6, 450.7, 485, 494; 249/82, 92, 120, 121, 162; 425/112, 202, 204, 324.1, 297, 330, 307, 308, 403.1, 163, 164, 315, 371, 395, 408, 410, 411; 426/618, 393, 412, 512, 513

[56] References Cited

U.S. PATENT DOCUMENTS

| | | | |
|---|---|---|---|
| 4,437,826 | 3/1984 | Tezuka | 425/408 X |
| 4,548,571 | 10/1985 | Suzuki | 99/485 X |
| 4,552,523 | 11/1985 | Suzuki | 99/450.1 |
| 4,556,379 | 12/1985 | Ikishima | 425/308 X |
| 4,597,731 | 7/1986 | Suzuki | 426/512 X |
| 4,637,304 | 1/1987 | Sukuki | 99/450.2 |
| 4,674,967 | 6/1987 | Oseka | 99/450.1 |
| 5,169,231 | 12/1992 | Suzuki | 99/353 |
| 5,201,265 | 4/1993 | Matsui | 99/353 |
| 5,381,728 | 1/1995 | Tateno | 99/450.4 |
| 5,399,082 | 3/1995 | Shimizu | 425/408 |
| 5,595,105 | 1/1997 | Kang | 99/352 X |
| 5,634,396 | 6/1997 | Isobe et al. | 99/353 X |

*Primary Examiner*—Timothy F. Simone
*Attorney, Agent, or Firm*—Paul A. Guss

[57] ABSTRACT

A mold frame of a boiled rice-shaping apparatus is installed to a chamber-forming member, and vinegared rice is charged in a chamber which is formed by a bottom section, end surface sections, and side surface sections. The mold frame is removed, and a handle is grasped so that a first rotatable plate is rotated in a direction of the arrow A, and a second rotatable plate is rotated in a direction of the arrow B. Thus, the vinegared rice is pressed and compressed in a widthwise direction. Further, a lid member is displaced in a direction to make approach to the bottom section. Thus, the vinegared rice is pressed and compressed in a vertical direction to be shaped to have a predetermined shape. Accordingly, neither sophisticated technique nor experience of a production operator is required to lump and shape the vinegared rice, there is no difference in quality depending on the production operator, the installation space of the boiled rice-shaping apparatus is decreased as small as possible, and it is easy to maintain and manage the apparatus.

12 Claims, 15 Drawing Sheets

BOILED RICE-SHAPING APPARATUS

BACKGROUND OF THE INVENTION

1. Field of the Invention

The present invention relates to a boiled rice-shaping apparatus which makes it possible to shape boiled rice to have a predetermined shape and a size with ease, for example, when hand-shaped sushi or shaped sushi (nigirizushi) and rice ball (omusubi) are produced.

2. Description of the Related Art

Conventionally, when boiled rice is lumped and hardened to produce, for example, shaped sushi and rice ball, a predetermined amount of boiled rice is shaped or formed with hands, or boiled rice is charged in a mold formed with a wood frame or the like. For example, when shaped sushi is produced, a predetermined amount of vinegared rice (sushimeshi) is placed on hand. The vinegared rice is shaped and hardened to have a substantially rectangular shape to produce a so-called vinegared rice cake (sharidama). A seafood topping (neta) such as tuna is optionally placed on the vinegared rice cake to be eaten.

Some sushi shops and take-out food shops are provided with an automatic boiled rice-shaping apparatus suitable for mass production.

However, in the case of the former conventional technique, a sophisticated technique and experience are required to uniformly produce a desired shaped sushi with good appearance. The quality of the shaped sushi differs depending on a cook, and the operation efficiency is not so good.

On the other hand, in the case of the latter conventional technique, a large space is required to install the apparatus. It is complicated to maintain and manage the apparatus. A problem is pointed out in that the price of the apparatus is expensive. A drawback is pointed out in that it is impossible to produce vinegared rice cakes so efficiently even when such an apparatus is used. Further, for example, the automatic boiled rice-shaping apparatus as described above requires careful washing operation after completion of daily work, revealing inconveniences that such an apparatus is extremely complicated, and a lot of labor and cost are required to maintain and manage the apparatus.

SUMMARY OF THE INVENTION

A general object of the present invention is to provide a boiled rice-shaping apparatus in which neither sophisticated technique nor experience is required to lump and shape boiled rice, there is no difference in quality depending on a production operator, the installation space is decreased as small as possible, it is easy to maintain and manage the apparatus, and the price is low.

A principal object of the present invention is to provide a boiled rice-shaping apparatus in which boiled rice is charged in a chamber formed by a bottom section and first and second side plates provided in an upstanding manner with respect to the bottom section, the first and second side plates are displaced in direction to make approach to one another, and a lid member is allowed to make approach to the bottom section so that the boiled rice may be compressed.

Another object of the present invention is to provide a boiled rice-shaping apparatus in which the first and second side plates are formed by first and second rotatable plates respectively, and the first and second rotatable plates are rotated in directions to make approach to one another so that the boiled rice may be pressed and compressed in the widthwise direction.

Still another object of the present invention is to provide a boiled rice-shaping apparatus in which the second side plate is allowed to make approach to the first side plate by the aid of a slider so that the boiled rice may be pressed and compressed in the widthwise direction.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The boiled rice-shaping apparatus according to the present invention will be explained in detail below with reference to the accompanying drawings, as exemplified by preferred embodiments.

Figure 1:
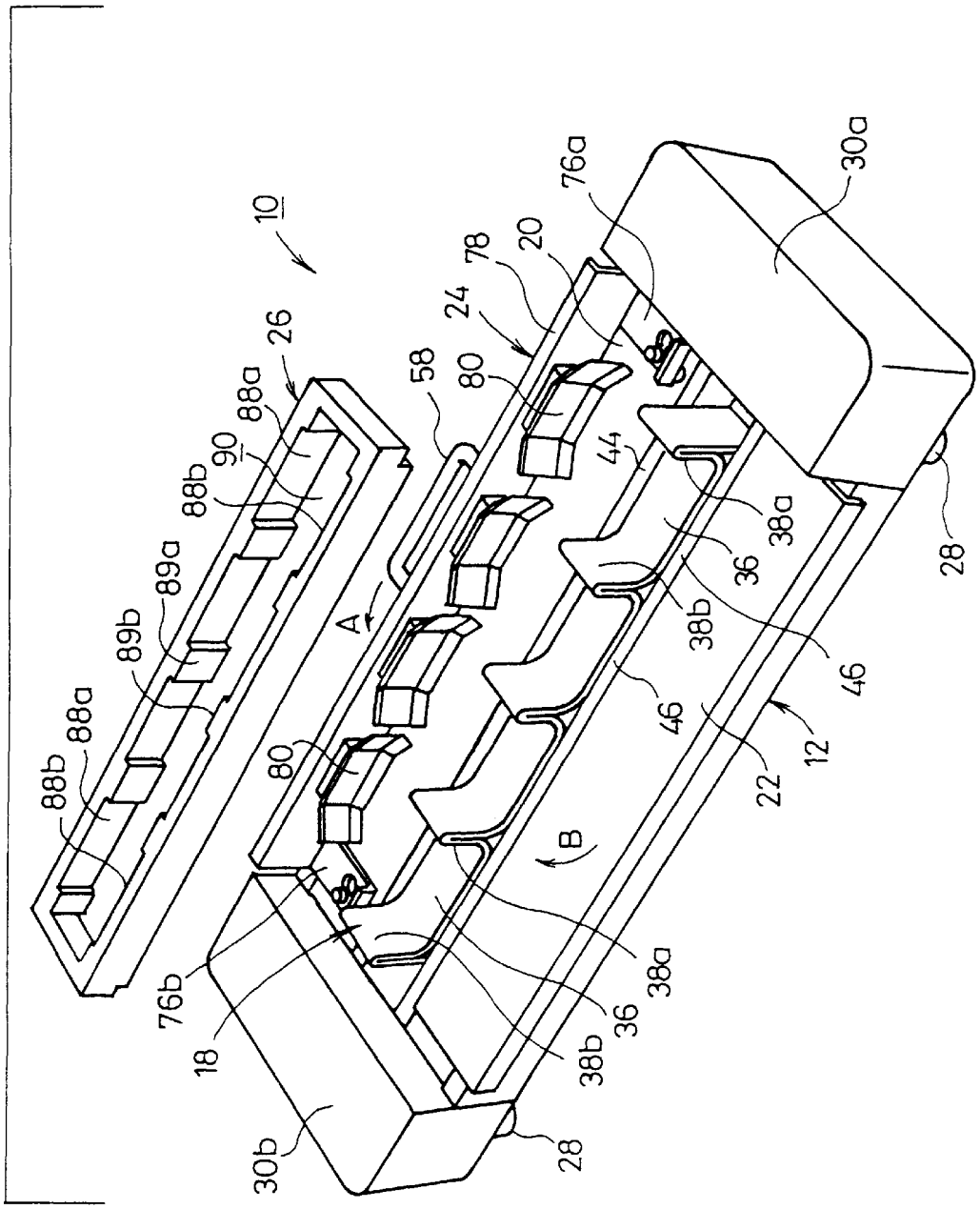
FIG. 1 shows a perspective view illustrating a boiled rice-shaping apparatus according to a first embodiment of the present invention.
Figure 2:
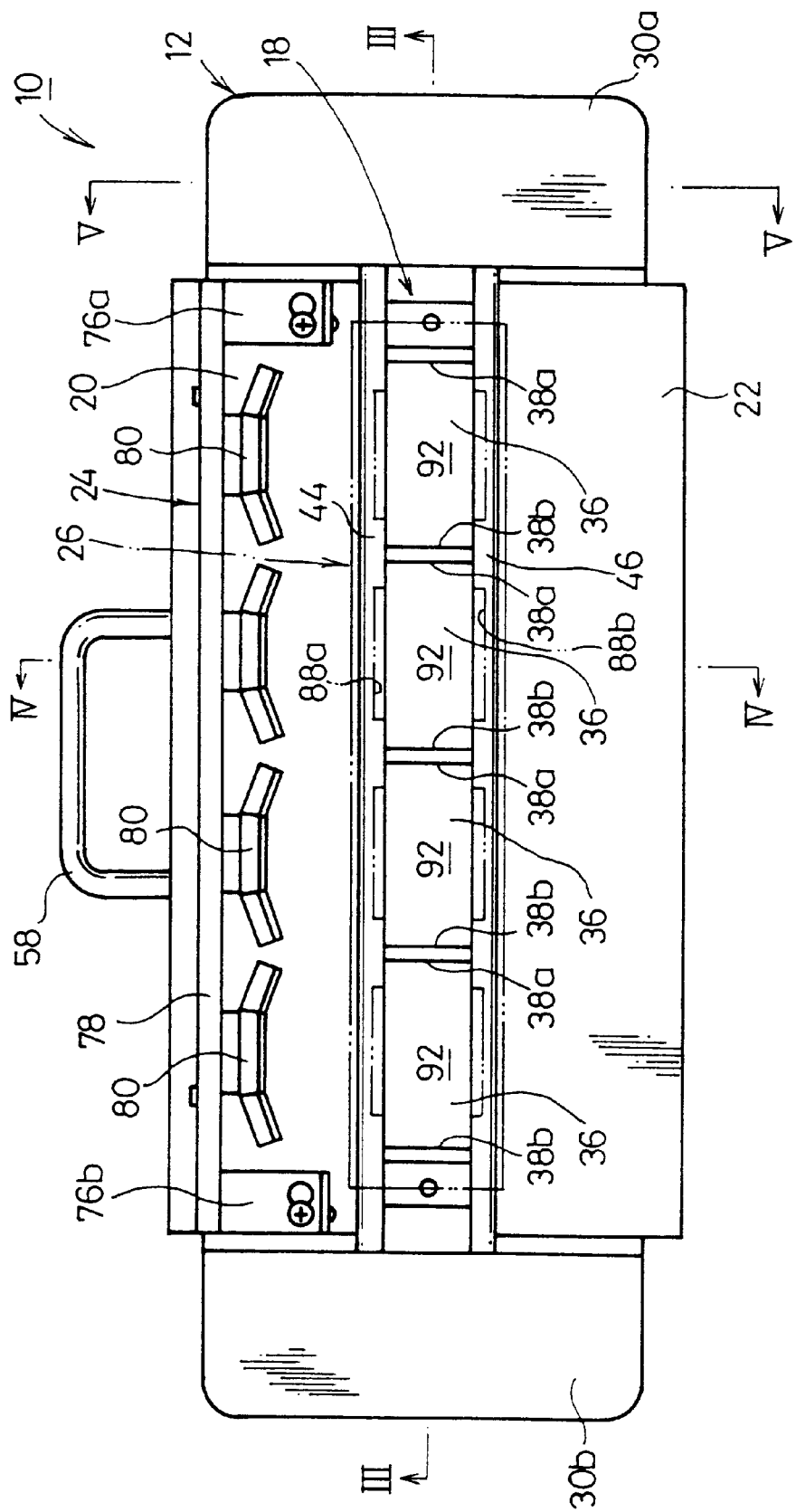
FIG. 2 shows a plan view illustrating the boiled rice-shaping apparatus shown in FIG. 1.

With reference to FIGS. 1 and 2, reference numeral 10 denotes a boiled rice-shaping apparatus according to a first embodiment of the present invention. The boiled rice-shaping apparatus 10 comprises a base stand 12, a chamber-forming member 18 which is provided detachably with respect to the base stand 12, first and second rotatable plates 20, 22 which are provided on sides of the chamber-forming member 18 and which are rotatable in directions opposite to one another, a lid member support mechanism 24 which is provided on the first rotatable plate 20 and which is capable of making approach and separation with respect to the chamber-forming member 18, and a mold frame 26 which is detachable with respect to the chamber-forming member 18.

Figure 3:
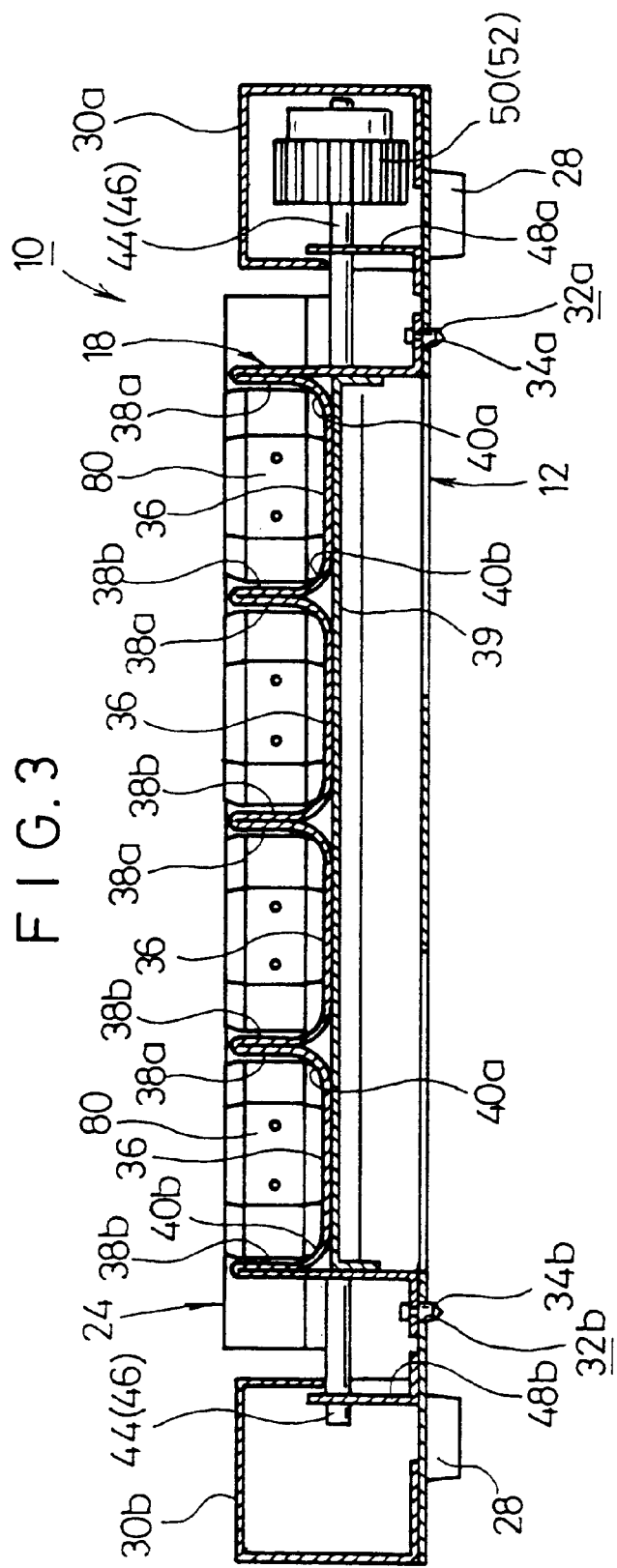
FIG. 3 shows a sectional view taken along a line III—III illustrating the boiled rice-shaping apparatus shown in FIG. 2.

A plurality of leg members 28 are provided on a lower surface of the base stand 12. Expanded sections 30a, 30b each having a substantially rectangular configuration are formed at both ends in the longitudinal direction of the base stand 12. As shown in FIG. 3, holes 32a, 32b are defined through a bottom section of the base stand 12. Pin members 34a, 34b, which are secured to both ends of the chamber-forming member 18, are detachably inserted into the holes 32a, 32b. The chamber-forming member 18 is composed of a lengthy plate member formed to have a bent configuration. The chamber-forming member 18 has a plurality of bottom sections 36, and end surface sections 38a, 38b which are provided perpendicularly at ends of the respective bottom sections 36 while being separated from each other by predetermined spacing distances to form pairs. The respective bottom sections 36 are isolated from each other by the end surface sections 38a, 38b. The bottom section 36 and the end surface sections 38a, 38b are formed to be continuous with curved surface sections 40a, 40b intervening therebetween. A base plate 39 for supporting the bottom sections 36 is secured to the lower surface of the chamber-forming member 18.

Figure 5:
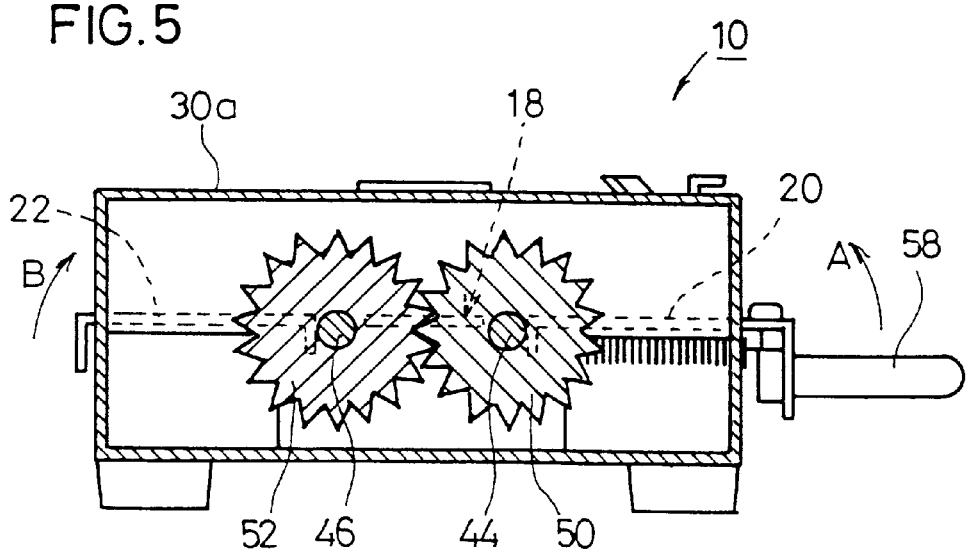
FIG. 5 shows a sectional view taken along a line V—V illustrating the boiled rice-shaping apparatus shown in FIG. 2.

First and second shaft members 44, 46 are rotatably provided in a bridged manner between the expanded sections 30a, 30b to extend adjacently to the sides of the chamber-forming member 18 respectively. The first and second shaft members 44, 46 are rotatably supported by shaft support members 48a, 48b which are secured to the bottom section of the base stand 12 respectively. First and second gears 50, 52 are secured to first ends of the first and second shaft members 44, 46 respectively. The first and second gears 50, 52 are arranged in the first expanded section 30a. The first and second gears 50, 52 are meshed with each other. Accordingly, the first and second shaft members 44, 46 are rotated in directions opposite to one another (see FIG. 5).

Figure 4:
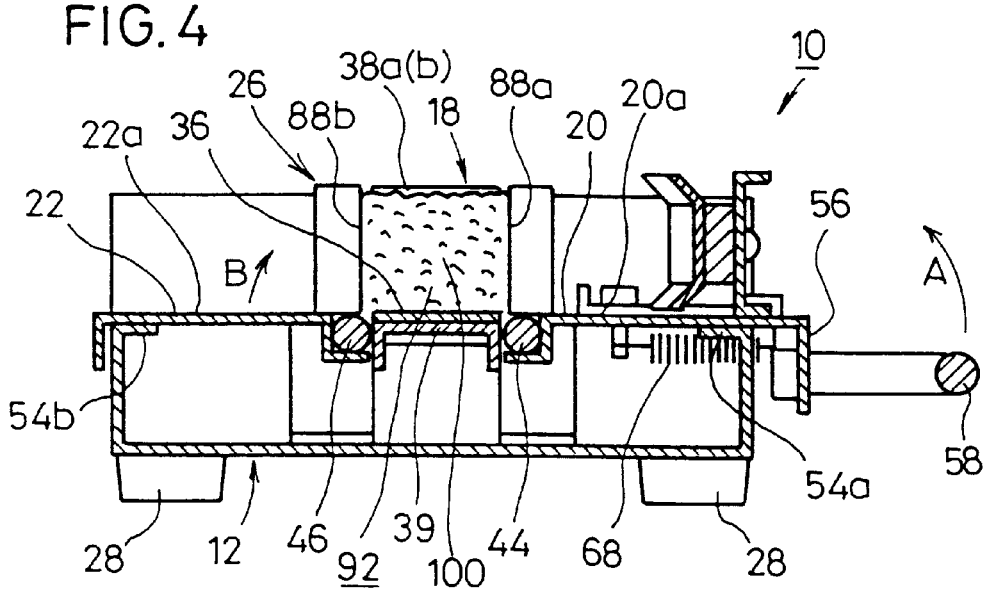
FIG. 4 shows a sectional view taken along a line IV—IV illustrating the boiled rice-shaping apparatus shown in FIG. 2.

A first rotatable plate 20 is secured to the first shaft member 44, while a second rotatable plate 22 is secured to the second shaft member 46. When the first and second rotatable plates 20, 22 abut against edges 54a, 54b of the base stand 12 in accordance with the rotating action of the first and second shaft members 44, 46, the bottom section 36 of the chamber-forming member 18 and the first and second rotatable plates 20, 22 are substantially flushed with each other, i.e., they form a flat surface (see FIG. 4). Upper surfaces of the first and second rotatable plates 20, 22 are formed to serve as pressing surfaces 20a, 22a respectively. The first rotatable plate 20 is formed with a bent section 56 which is disposed at an edge on a side opposite to the first shaft member 44. A handle 58 is secured to the bent section 56.

Figure 6:
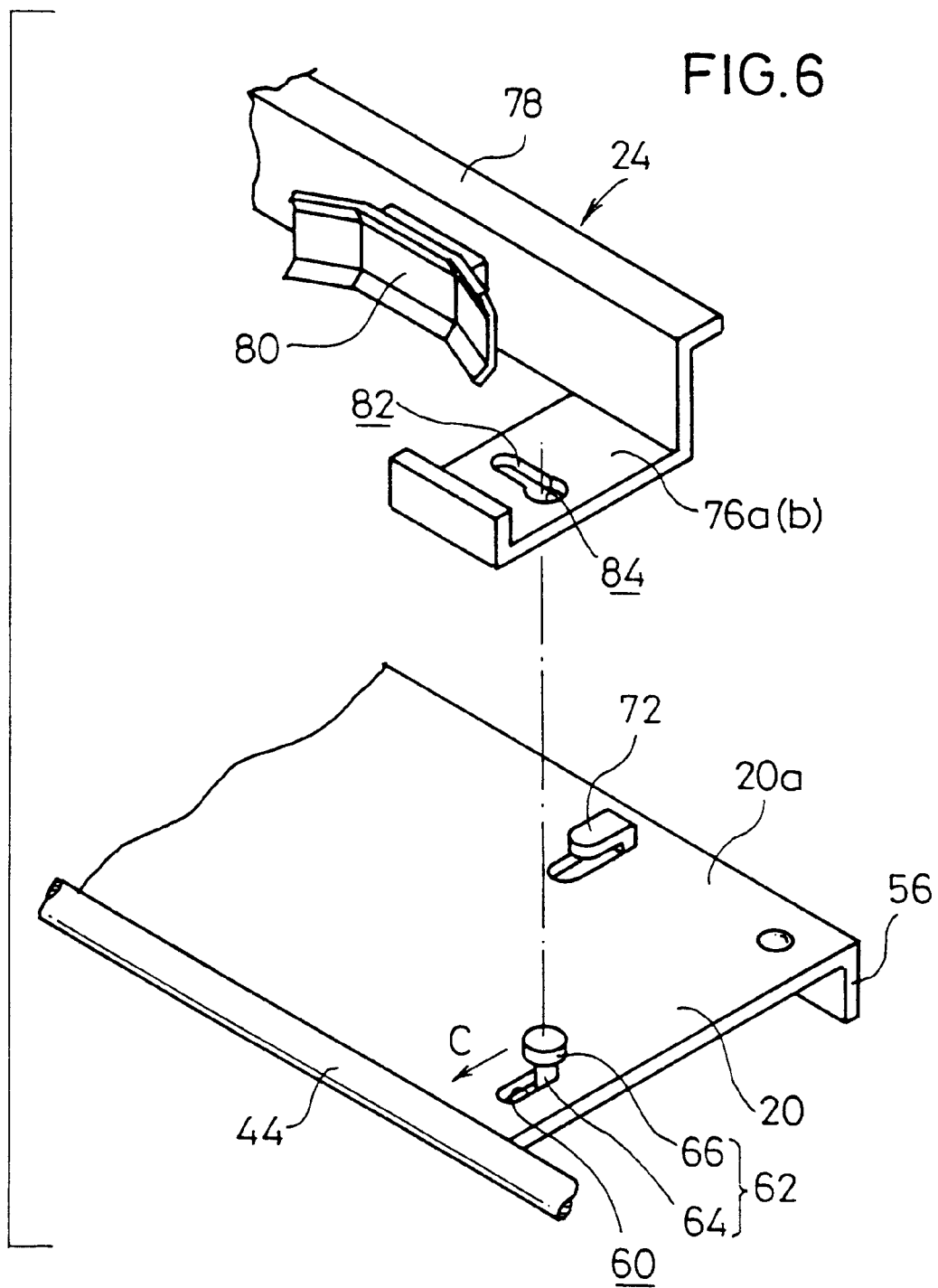
FIG. 6 shows a partial magnified exploded perspective view illustrating the boiled rice-shaping apparatus shown in FIG. 1.
Figure 7:
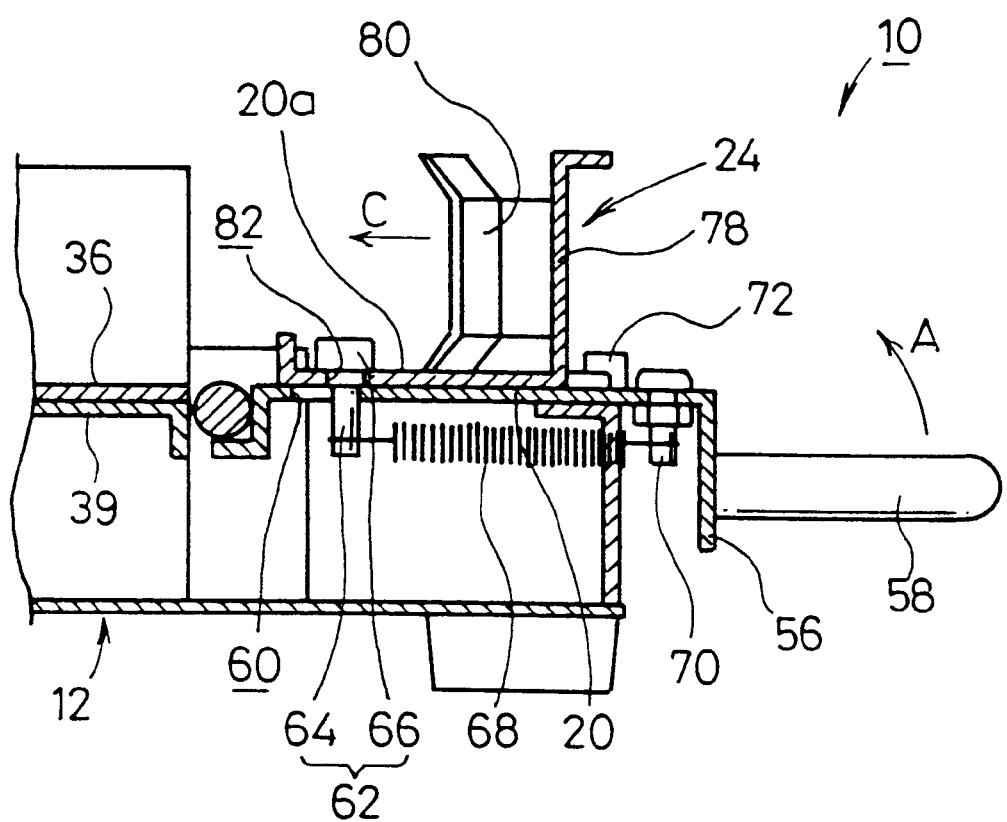
FIG. 7 shows a partial magnified longitudinal sectional view illustrating the boiled rice-shaping apparatus shown in FIG. 1.

As shown in FIG. 6, a long hole 60 is defined in the vicinity of the end of the first rotatable plate 20. A pin member 62 is displaceably inserted into the long hole 60. The pin member 62 has a shaft 64. A head 66 is formed on an end of the shaft 64 protruding on the side of the pressing surface 20a. As shown in FIG. 7, one end of a coil spring 68 is hooked to the other end of the shaft 64. The other end of the coil spring 68 is hooked to a pin member 70 which is provided in the vicinity of the edge of the first rotatable plate 20. Accordingly, the pin member 62 is always energized in a direction to make approach to the pin member 70. A pawl 72, which protrudes upwardly from the pressing surface 20a, is formed on the first rotatable plate 20.

The lid member support mechanism 24 is detachably provided on the first rotatable plate 20 (see FIG. 1). The lid member support mechanism 24 comprises a lengthy support member 78 which is provided with bent sections 76a, 76b at both ends, and a plurality of lid members 80 which are secured to the support member 78. The lid member 80 has a deformed octagonal configuration, and it is formed to be concave at its central portion. The lid members 80 are arranged at equal spacing distances on the support member 78. As shown in FIG. 6, a long hole 82 is defined through each of the bent sections 76a, 76b. A diametrally expanded section 84 is formed on a side of one end of the long hole 82. The head 66 of the pin member 62, which is provided on the first rotatable plate 20, is insertable into the diametrally expanded section 84. The shaft 64 is displaceable along the long hole 82. Accordingly, the head 66 is inserted into the diametrally expanded section 84 of the bent section 76a, 76b, and the bent section 76a, 76b is displaced in the extending direction of the long hole 82. Thus, the shaft 64 is displaced in the long hole 82, and the head 66 is engaged with the opening of the long hole 82 so that the lid member support mechanism 24 is installed to the first rotatable plate 20. In this arrangement, the edge of the support member 78 is engaged with the pawl 72. Thus, the support member 78 is positioned with respect to the first rotatable plate 20.

Figure 8:
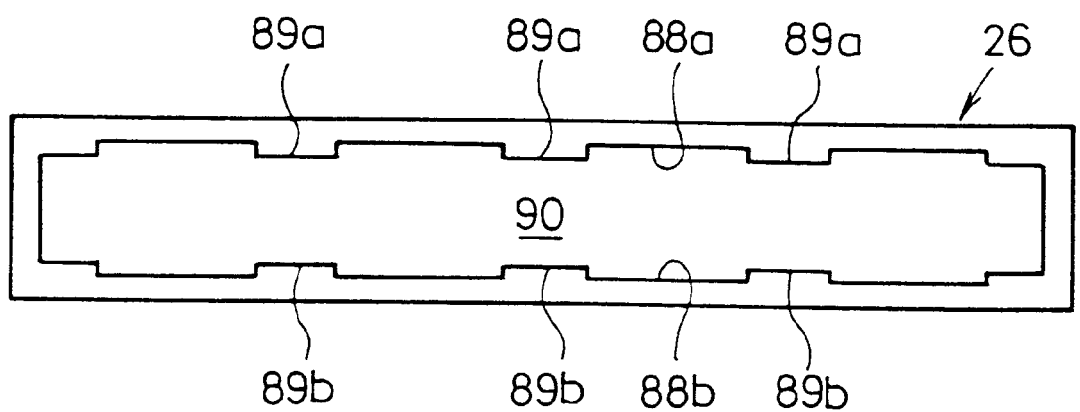
FIG. 8 shows a plan view illustrating a mold frame to be used for the boiled rice-shaping apparatus shown in FIG. 1.

As shown in FIG. 8, the mold frame 26, which is detachable with respect to the chamber-forming member 18, is formed to have a lengthy configuration, with a mold hole 90 formed at its central portion. A pair of side surface sections 88a, 88b are formed on walls for forming the mold hole 90 so that they are disposed along the side portions of the bottom section 36 when the mold frame 26 is installed to the chamber-forming member 18. The spacing distance between the side surface sections 88a, 88b is formed to be slightly larger than the width of the bottom section 36. Projections 89a, 89b are formed on the side surface sections 88a, 88b so that they coincide with the width of the end surface sections 38a, 38b at positions corresponding to the end surface sections 38a, 38b of the chamber-forming member 18.

The boiled rice-shaping apparatus 10 according to the first embodiment is basically constructed as described above. Next, explanation will be made for the operation of the boiled rice-shaping apparatus 10 as exemplified by a case in which vinegared rice cakes for shaped sushi are produced.

At first, the first and second rotatable plates 20, 22 are rotated to give a substantially flat state with respect to the bottom sections 36 of the chamber-forming member 18. When the mold frame 26 is installed to the chamber-forming member 18, a chamber 92 is formed by the bottom section 36, the end surface sections 38a, 38b, and the side surface sections 88a, 88b (see FIG. 4).

After completion of the preparatory step performed as described above, the chamber 92 is charged with vinegared rice 96 so that the chamber 92 is filled therewith in the widthwise direction and in the height direction. In this process, the capacity of the chamber 92 is constant. Therefore, the amount of the vinegared rice 96 charged in the chamber 92 is always constant. After that, the mold frame 26 is removed from the chamber-forming member 18.

Figure 9:
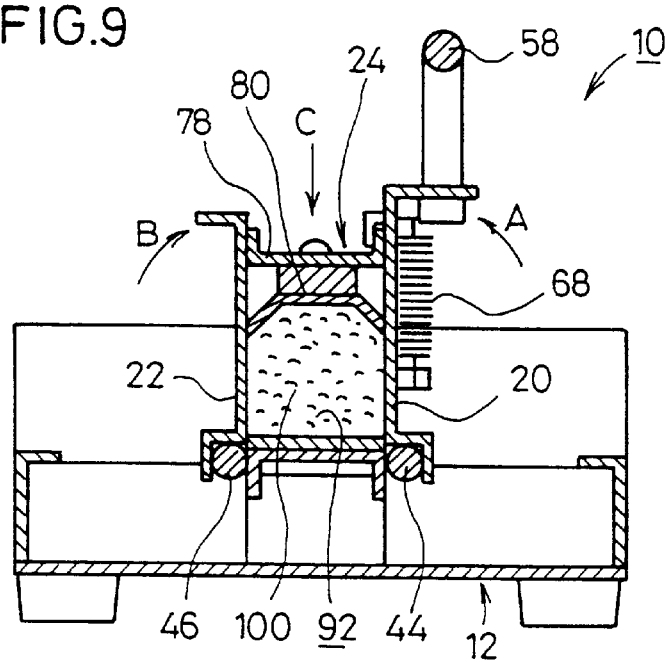
FIG. 9 illustrate a method for using the boiled rice-shaping apparatus shown in FIG. 4, depicting a sectional view taken along a line V—V in a state in which boiled rice is pressed and compressed by a first rotatable plate and a second rotatable plate.

Subsequently, when the handle 58 is grasped to rotate the first rotatable plate 20 in a direction of the arrow A, then the second rotatable plate 22 is rotated in a direction of the arrow B by the aid of the first and second gears 50, 52, and the first and second rotatable plates make approach to one another. Accordingly, as shown in FIG. 9, the vinegared rice 96 charged in the chambers 92 is pressed and compressed in the widthwise direction by the first and second rotatable plates 20, 22.

Figure 10:
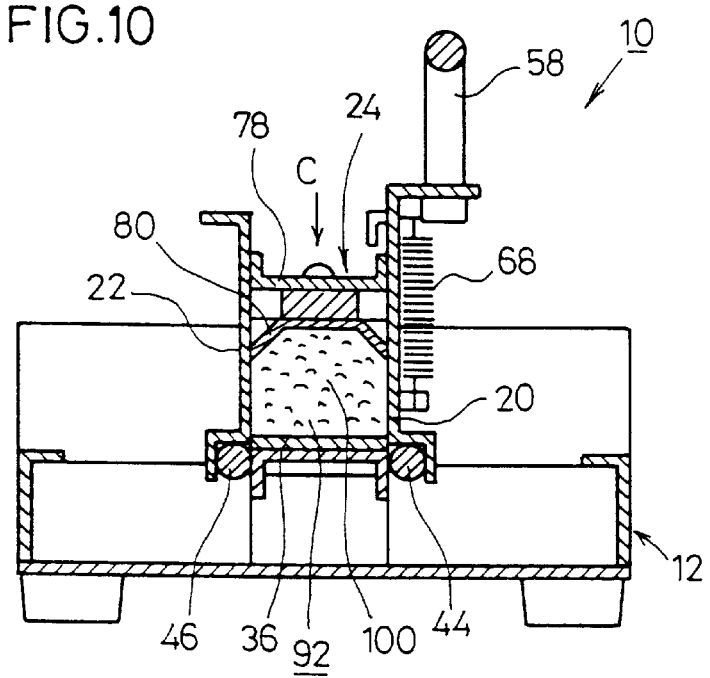
FIG. 10 illustrate the method for using the boiled rice-shaping apparatus shown in FIG. 4, depicting a sectional view taken along the line V—V in a state in which the boiled rice is pressed and compressed by a lid member.

After that, when the support member 78 of the lid member support mechanism 24 is pressed in a direction of the arrow C, then the pin members 62 slide on the walls for forming the long holes 60 together with the lid member support mechanism 24 in opposition to the tensile force of the coil springs 68, and the support member 78 is displaced in the direction of the arrow C (see FIGS. 6 and 7). Accordingly, as shown in FIG. 10, the lid members 80 approach the bottom sections 36, and the vinegared rice 96 is pressed and compressed in the vertical direction.

The vinegared rice 96 is pressed and compressed in the widthwise direction and in the vertical direction as described above. Therefore, the vinegared rice 96 is lumped and hardened in the chamber 92, and thus so-called vinegared rice cakes are formed.

Subsequently, the support member 78 is displaced in a direction to make separation from the bottom sections 36 in accordance with the energizing action of the coil springs 68. The handle 58 is grasped to rotate the first and second rotatable plates 20, 22 in directions to make separation from each other. The bottom sections 36 of the chamber-forming member 18 and the first and second rotatable plates 20, 22 are allowed to be at the positions at which they are substantially flat again. Thus, the shaped vinegared rice cakes are removed. The vinegared rice cakes are lumped and hardened to have an appropriate hardness. Therefore, the shape of the vinegared rice cake is not collapsed.

In the first embodiment, the plurality of vinegared rice cakes are simultaneously obtained by using the chambers 92 formed as the plurality of individuals. Each of the vinegared rice cakes is formed by lumping and hardening the same amount of the vinegared rice 96 with the same force. Therefore, the vinegared rice cakes are formed to have an equivalent quality.

Japanese horseradish (wasabi) is optionally applied to the vinegared rice cake obtained as described above. A seafood topping such as a strip of tuna is placed thereon to complete the shaped sushi.

When the boiled rice-shaping apparatus 10 is washed, the pin members 34a, 34b of the chamber-forming member 18 are disengaged from the holes 32a, 32b of the base stand 12 to remove the chamber-forming member 18 from the base stand 12 (see FIG. 3). The lid member support mechanism 24 is removed from the first rotatable plate 20 (see FIGS. 6 and 7). In this process, the lid member support mechanism 24 is displaced along the long holes 82 so that the positions of the diametrally expanded sections 84 of the long holes 82 formed through the lid member support mechanism 24 are coincident with the heads 66 of the pin members 62 provided for the first rotatable plate 20. The heads 66 are removed from the diametrally expanded sections 84, and the support member 78 is removed from the pawls 72. Thus, the lid member support mechanism 24 can be removed from the first rotatable plate 20.

The boiled rice and the like adhered to the boiled rice-shaping apparatus 10 can be easily washed out by removing and washing the chamber-forming member 18 and the lid member support mechanism 24.

According to the boiled rice-shaping apparatus 10 according to the first embodiment, neither sophisticated technique nor experience of the production operator is required to lump and shape boiled rice, the boiled rice can be easily lumped and hardened to have a predetermined size in a short period of time, and it is possible to obtain the boiled rice shaped to have the same quality as that obtained by human hands even when anyone performs the production. Further, the installation space is decreased as small as possible, it is easy to maintain and manage the apparatus, and it is possible to provide the apparatus at a low price. Furthermore, all of the mechanism is manually operated, and hence it is unnecessary to use any power source such as electricity. Therefore, the apparatus is safe, because there is no fear of accident due to electric leakage or the like when the apparatus is used in a kitchen in which water is used.

The apparatus has the simple structure. Therefore, any failure or disorder scarcely occurs, and it is possible to wash the entire apparatus easily and conveniently.

A plurality of shaped boiled rice cakes can be obtained by means of one time of operation. Therefore, the production efficiency is improved.

Next, a boiled rice-shaping apparatus 100 according to a second embodiment will be explained with reference to FIGS. 11 and 12.

The boiled rice-shaping apparatus 100 comprises a housing 112 having a substantially oblong configuration. A substantially rectangular expanded section 114 is formed at one end of the housing 112 in the longitudinal direction. The housing 112 includes a plate-shaped base stand 116 which is provided in an upstanding manner on the bottom section of the housing 112. Both ends of the base stand 116 are formed to have a bent configuration to be secured to the bottom section of the housing 112. As shown in FIGS. 12 and 13, a plurality of holes 118 are defined at equal spacing distances through upper central portions of the base stand 116. A plate-shaped stand member 120, which is formed to have a substantially rectangular configuration, is arranged movably back and forth through each of the holes 118. An upper surface of the stand member 120 is formed as a bottom section 121. The stand member 120 is supported at its lower portion by an attachment member 122 having a substantially oblong longitudinal cross section.

A guide member 124 is secured at the inside of the base stand 116. The attachment member 122 is inserted movably vertically into a hole 126 defined through the guide member 124. Lower ends of the respective attachment members 122 are connected by a lengthy connecting member 128. One end of an arm member 130, which is formed in a bent configuration, abuts against a lower surface of the connecting member 128. A handling section 132 is formed at the other end of the arm member 130. The arm member 130 is rotatably supported by a shaft member 135 which is secured to the bottom section of the housing 112. The shaft member 135 is held in the horizontal direction by a bearing member 134. Therefore, when the arm member 130 is rotated in a direction of the arrow D as shown in FIG. 13, the stand member 120 is raised by the aid of the attachment member 122. The bearing member 134 is provided with a stopper 136. The stopper 136 energizes a ball member 138 in a direction toward the arm member 130 by using an unillustrated spring member provided therein. A hemispherical portion of the ball member 138 protrudes from the stopper 136. Therefore, when the arm member 130 is rotated in the direction of the arrow D as described above, the ball member 138 is engaged with an engaging hole 140 which is defined on the arm member 130. Thus, the arm member 130 is held at a position indicated by two-dot chain lines shown in FIG. 13.

Figure 11:
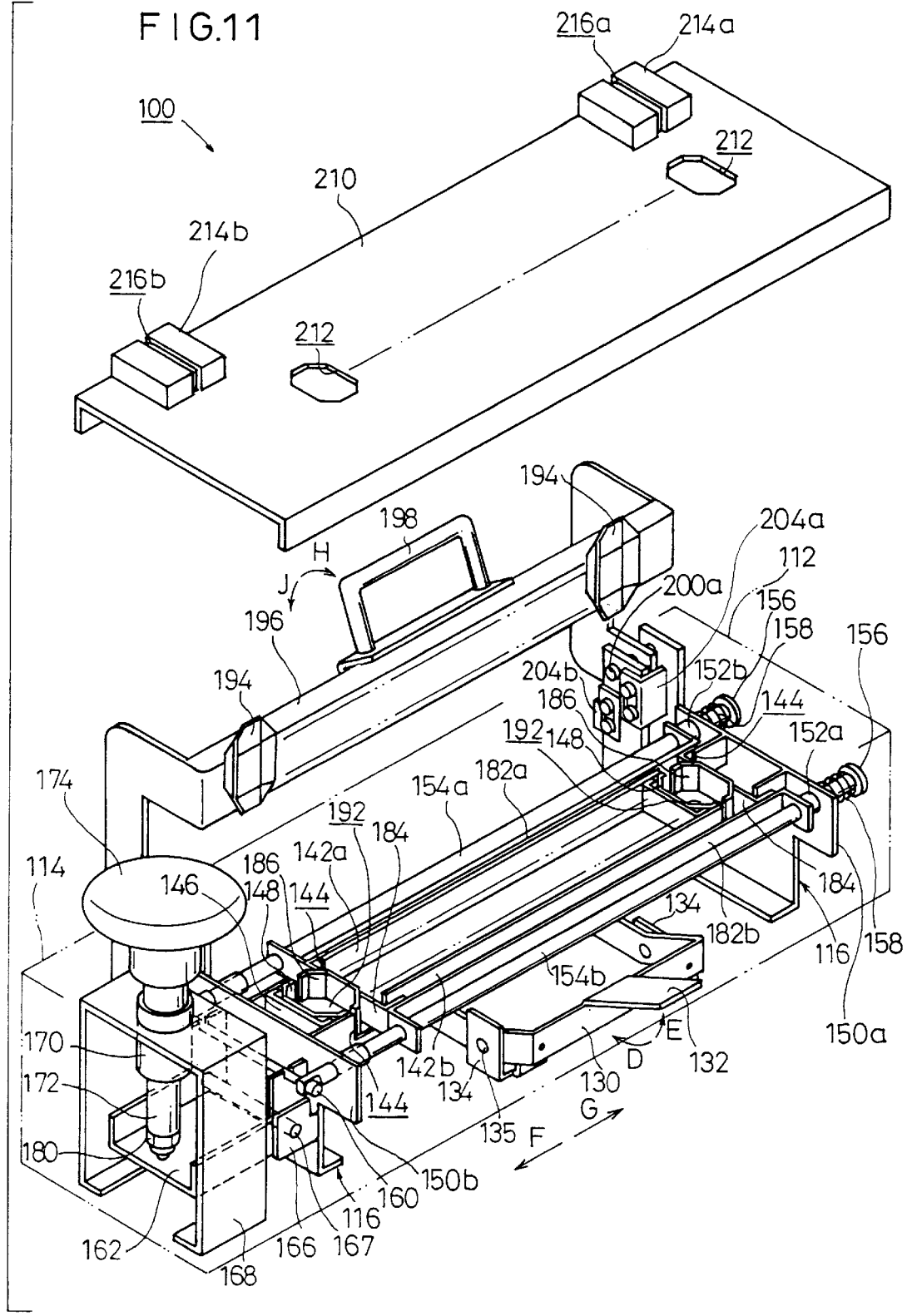
FIG. 11 shows an exploded perspective view illustrating a boiled rice-shaping apparatus according to a second embodiment of the present invention.
Figure 12:
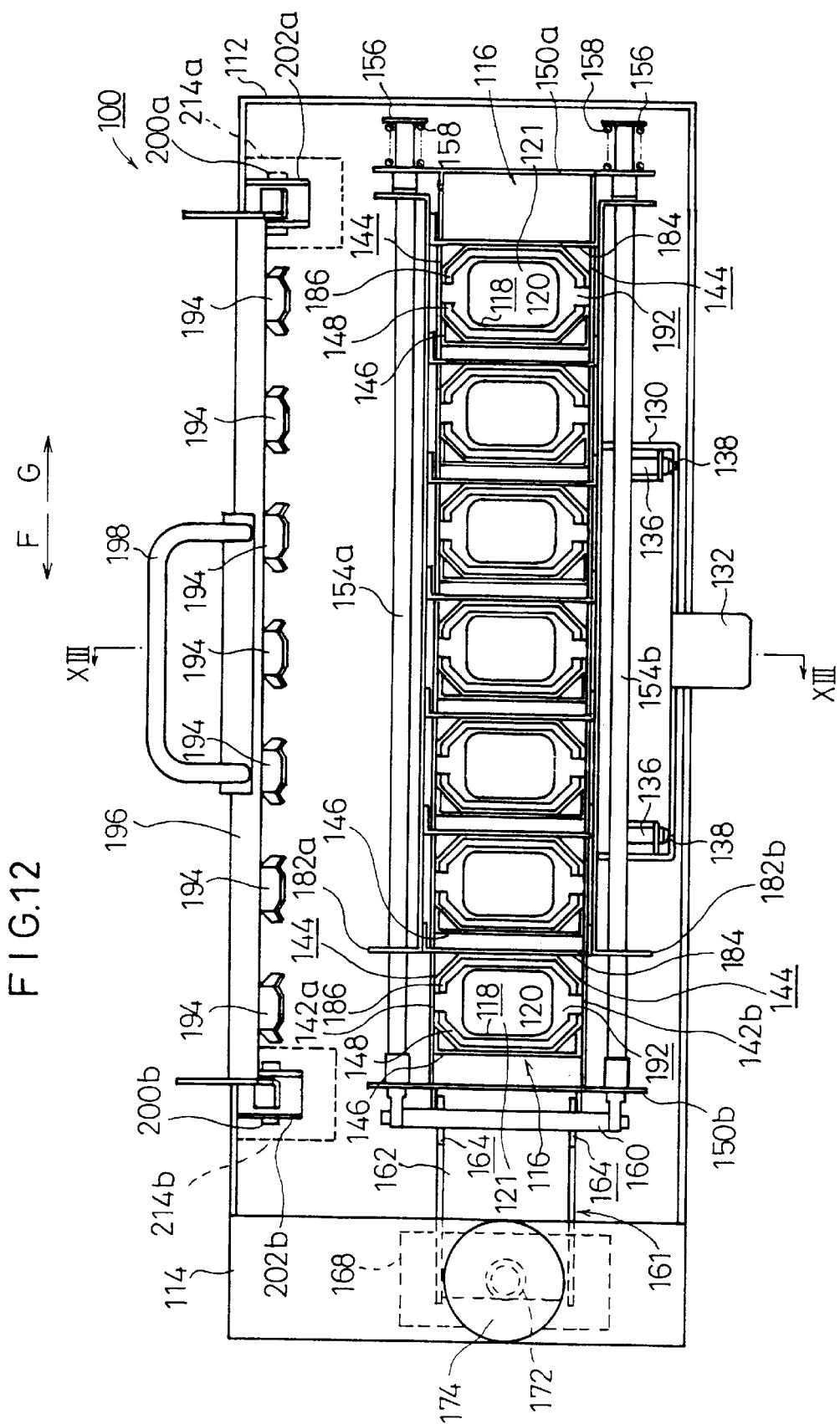
FIG. 12 shows a plan view illustrating the boiled rice-shaping apparatus shown in FIG. 11.
Figure 13:
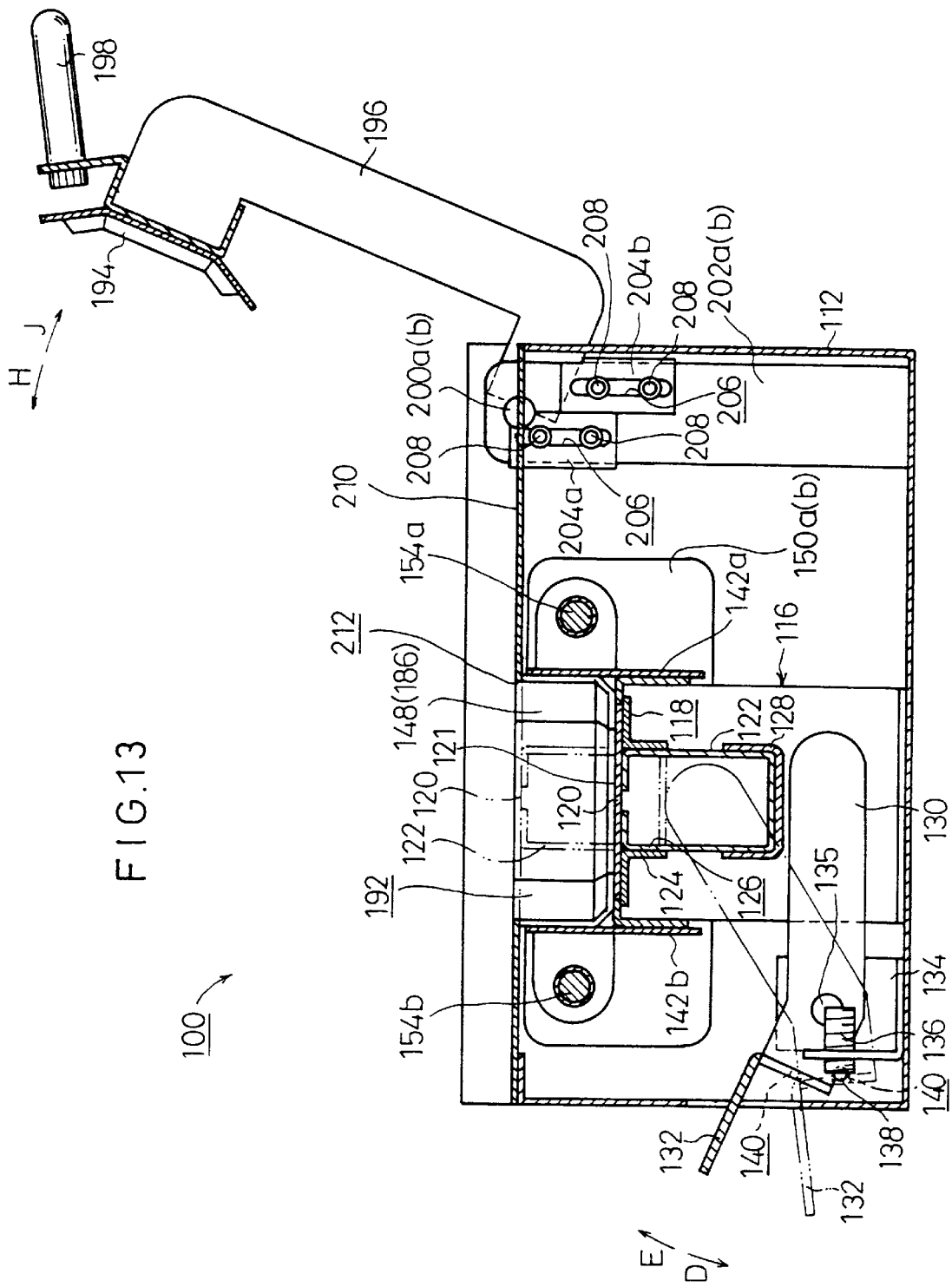
FIG. 13 shows a sectional view taken along a line XIII—XIII illustrating the boiled rice-shaping apparatus shown in FIG. 12.

As shown in FIGS. 11, 12, and 13, holding members 142a, 142b are secured in parallel to one another to edges of the base stand 116 along the longitudinal direction. Each of the holding members 142a, 142b is provided with a plurality of recesses 144 which are separated from each other by predetermined spacing distances. The holding members 142a, 142b are bridged by a plurality of plate-shaped member 146 disposed therebetween. A fixed side plate 148 having a bent configuration is secured to each of the plate-shaped members 146. Support members 150a, 150b each having a flat plate-shaped configuration are secured to both ends of the base stand 116. The support members 150a, 150b are bridged by sliders 154a, 154b disposed therebetween, each of the sliders 154a, 154b having a rod-shaped configuration to be displaceable in the axial direction. Flanges 156 are formed at first ends of the sliders 154a, 154b. Spring members 158 are provided in gaps between the flanges 156 and the first support member 150a. Therefore, the sliders 154a, 154b are energized by the spring members 158 in a direction of the arrow G.

Figure 14:
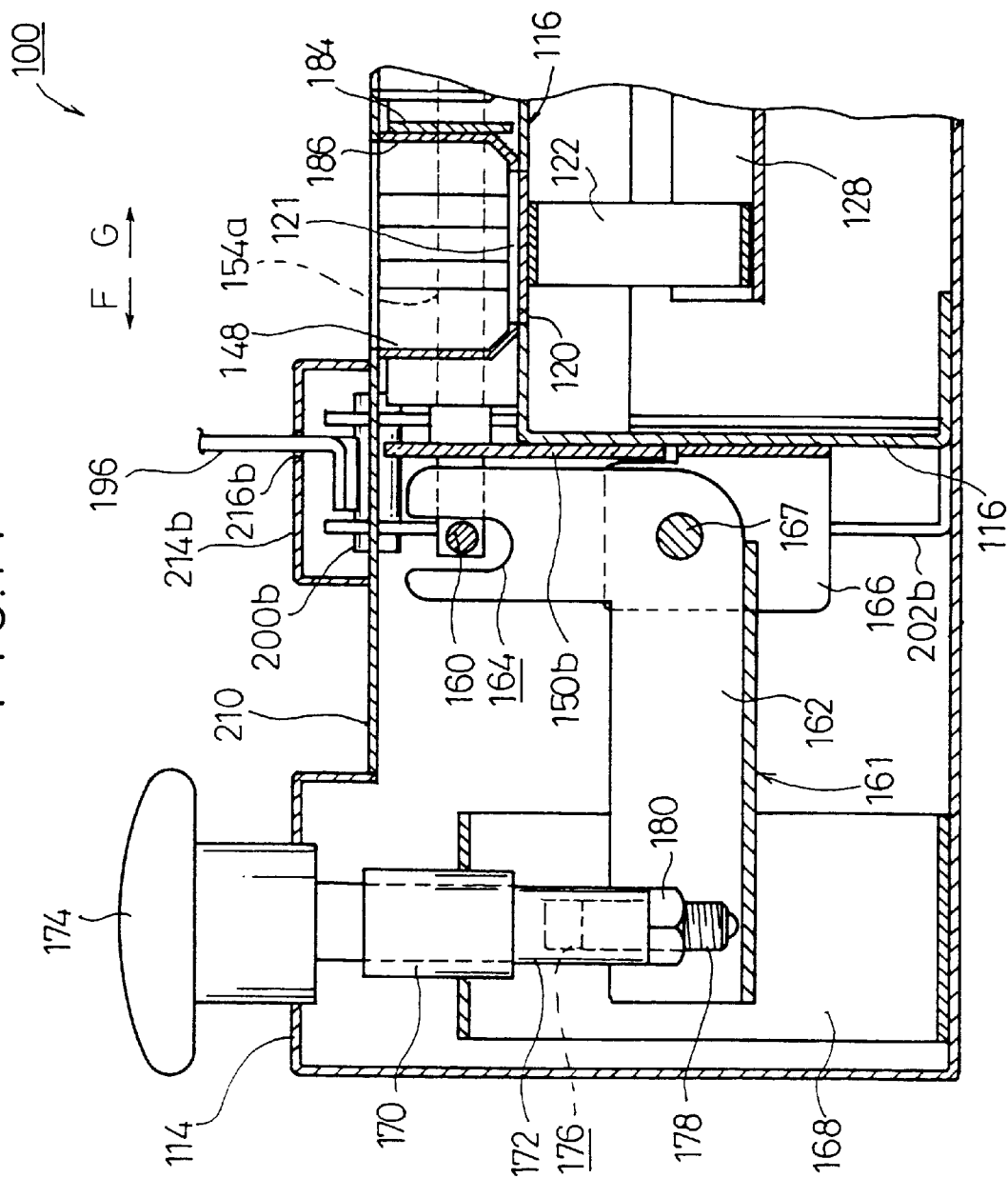
FIG. 14 shows a partial magnified longitudinal sectional view illustrating the boiled rice-shaping apparatus shown in FIG. 11.

Second ends of the sliders 154a, 154b are bridged by a pin ember 160. As shown in FIG. 14, the pin member 160 is engaged with slits 164 of a link member 162 which is bent and formed to have a substantially L-shaped configuration for constructing a crank mechanism 161. The link member 162 is rotatably supported at its corner portions by a support section 166 which is formed to have a bent configuration at the end of the base stand 116. Specifically, the support section 166 has a shaft member 167. The link member 162 is rotatable by the aid of the shaft member 167. A support member 168, which is formed to have a bent configuration, is provided in an upstanding manner to extend over the end of the link member 162 in the expanded section 114. A cylindrical member 170 is secured to an upper portion of the support member 168. A rod-shaped displacement member 172 is slidably inserted into the cylindrical member 170. An upper portion of the displacement member 172 protrudes upwardly from the expanded section 114, to which a grip section 174 is secured. A hole 176, which is threaded with a female thread in the axial direction, is defined at a lower portion of the displacement member 172. A screw 178 to serve as an adjusting mechanism is screwed into the hole 176. The protruding amount of the screw 178 is adjustable. The lower end of the screw 178 is formed to have a spherical configuration to make arbitrary abutment against the link member 162. When the grip section 174 is pressed downwardly, then the link member 162 is rotated about the center of the shaft member 167, and the sliders 154a, 154b are displaced in the direction perpendicular to the displacement direction of the displacement member 172, i.e., in the direction of the arrow F. The screw 178 is prevented from looseness by the aid of a nut 180.

As shown in FIGS. 11 and 12, displacement members 182a, 182b, each of which is formed to have a bent configuration, are secured to the sliders 154a, 154b. A plurality of plate-shaped members 184 are secured to the respective displacement members 182a, 182b to penetrate through the recesses 144 so that the displacement members 182a, 182b are bridged thereby (see FIG. 15A). A movable side plate 186 having a bent configuration is secured to each of the plate-shaped members 184 so that the movable side plate 186 is opposed to the fixed side plate 148. Therefore, when the sliders 154a, 154b are allowed to make sliding movement, then the movable side plate 186 slides in the direction of the arrow F or the arrow G, and the fixed side plate 148 and the movable side plate 186 make approach to one another or separation from each other.

End sections 190a to 190d are formed at both ends of the fixed side plate 148 and the movable side plate 186 with intervening inclined surface portions. When the movable side plate 186 slides to make approach to the fixed side plate 148, then the end section 190a abuts against the end section 190c, and the end section 190b abuts against the end section 190d. As a result, the length of the vinegared rice cake to be shaped is constant owing to the abutment caused by the end sections 190a to 190d. As shown in FIG. 13, the fixed side plate 148 and the movable side plate 186 are bent at their lower portions, and they are formed to be inclined inwardly. Therefore, a chamber 192 for charging boiled rice therein is defined by a part of the base stand 116, the fixed side plate 148, the movable side plate 186, and the bottom section 121.

Each of the chambers 192 is closed by a lid member 194. As shown in FIGS. 11 and 12, the lid member 194 has a deformed octagonal configuration formed to provide a recess at its central portion. The lid members 194 are secured to an arm member 196 at equal spacing distances. The arm member 196 is bent at its both ends, with a handle 198 secured at its central portion. As shown in FIGS. 12 and 13, the both ends of the arm member 196 are secured to shafts 200a, 200b. The shafts 200a, 200b are rotatably supported by shaft support members 202a, 202b which are provided in an upstanding manner at the inside of the housing 112. As shown in FIG. 13, the shaft support members 202a, 202b are provided with stoppers 204a, 204b each of which is formed to have an L-shaped cross section. Each of the stoppers 204a, 204b is defined with a long hole 206. A plurality of screws 208 pass through the long hole 206, and they are fastened to the shaft support member 202a, 202b. Thus, the positions of the stoppers 204a, 204b are adjustably fixed. One of the stoppers 204a abuts against the arm member 196 when the arm member 196 is rotated in a direction of the arrow H. The other stopper 204b abuts against the arm member 196 when the arm member 196 is rotated in a direction of the arrow J. Thus, the rotation range of the arm member 196 is controlled.

As shown in FIG. 11, a cover member 210 is disposed over the fixed side plates 148 and the movable side plates 186. Holes 212 are defined through the cover member 210 corresponding to the chambers 192. The chambers 192 are open upwardly through the holes 212. Projections 214a, 214b, which protrude upwardly, are formed on portions of the cover member 210. Slits 216a, 216b are defined in the projections 214a, 214b. The arm member 196 is displaceable in the slits 216a, 216b.

The boiled rice-shaping apparatus 100 according to the second embodiment is basically constructed as described above. Next, explanation will be made for the operation of the boiled rice-shaping apparatus 100 as exemplified by a case in which vinegared rice cakes for shaped sushi are produced.

At first, as shown in FIGS. 12 and 13, the lid members 194 are in a lid-open state. That is, the arm member 196 is rotated in the direction of the arrow J by the aid of the handle 198, and the lid members 194 are separated from the chambers 192. At this time, the sliders 154a, 154b are displaced in the direction of the arrow G by the aid of the spring member 158, and the fixed side plates 148 are separated from the movable side plates 186 as shown in FIG. 15A.

Figure 15:
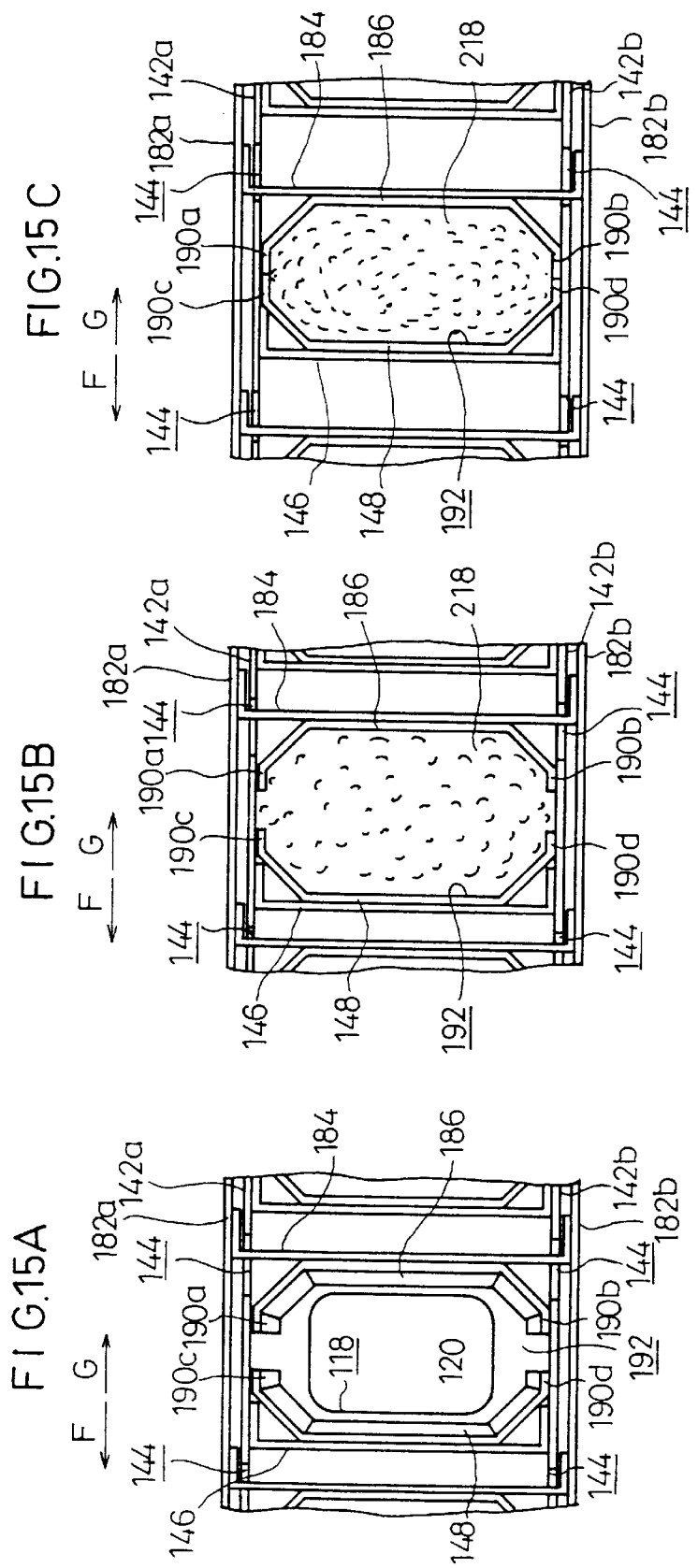
FIG. 15A shows a partial plan view illustrating the boiled rice-shaping apparatus shown in FIG. 11.
FIG. 15B shows a partial plan view illustrating a state in which boiled rice is charged in the boiled rice-shaping apparatus shown in FIG. 11.
FIG. 15C shows a partial plan view illustrating a state in which the boiled rice is pressed in the widthwise direction in the boiled rice-shaping apparatus shown in FIG. 11.
Figure 16:
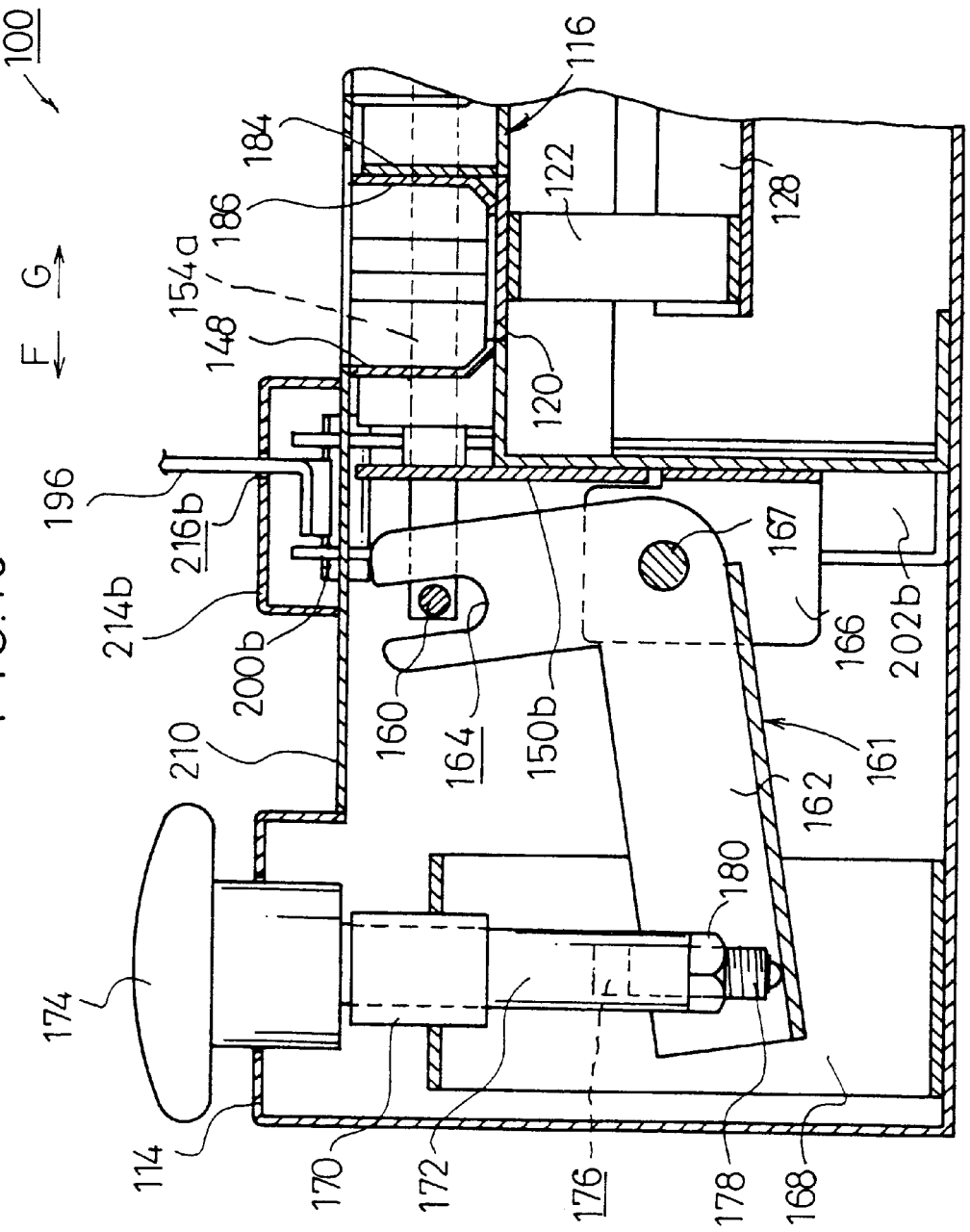
FIG. 16 shows a partial magnified sectional view illustrating an operating state of the boiled rice-shaping apparatus shown in FIG. 14, depicting a state in which a grip section is pressed.

Subsequently, as shown in FIG. 15B, the chamber 192 is charged with vinegared rice 218 so that the chamber 192 is filled therewith in the widthwise direction and in the height direction. In this process, the capacity of the chamber 192 is constant. Therefore, the amount of the vinegared rice 218 changed in the chamber 192 is always constant. After that, when the grip section 174 is pressed, then the link member 162 is pressed and rotated as shown in FIG. 16, and the sliders 154a, 154b are displaced in the direction of the arrow F. Accordingly, as shown in FIG. 15C, the plate-shaped member 184 is displaced in the recess 144, and the movable side plate 186 slides in the direction to make approach to the fixed side plate 148. Therefore, the vinegared rice 218 charged in the chamber 192 is compressed in the widthwise direction. When the hardness of the vinegared rice 218 is increased or decreased by adjusting the amount of compression of the vinegared rice 218 in the widthwise direction, the screw 178 may be adjusted. For example, when the protruding amount of the screw 178 is increased, the displacement amount of the sliders 154a, 154b is increased. Accordingly, the displacement amount of the movable side plate 186 is also increased, the compressing amount is increased, and thus the vinegared rice 218 is more hardened. On the other hand, when it is intended to decrease the compressing amount, the protruding amount of the screw 178 may be decreased.

Figure 17:
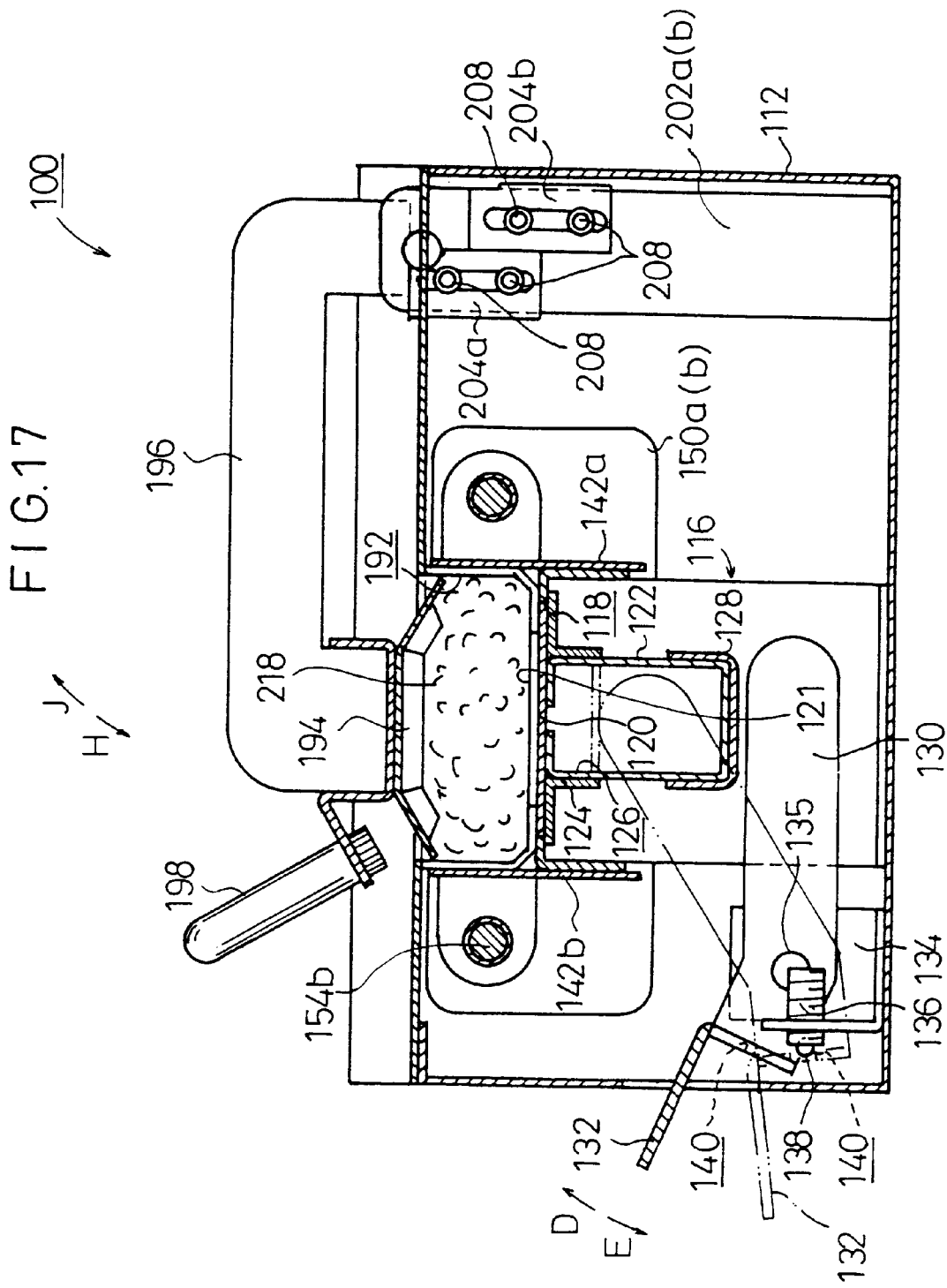
FIG. 17 shows a sectional view taken along a line XIII—XIII illustrating a method for using the boiled rice-shaping apparatus shown in FIG. 12, depicting a state in which the boiled rice is pressed in the vertical direction.

Subsequently, when the arm member 196 is rotated in the direction of the arrow H by operating the handle 198, then the lid member 194 is lowered and inserted into the chamber 192 as shown in FIG. 17, and the vinegared rice 218 is compressed in the vertical direction. When the amount for compressing the vinegared rice 218 in the vertical direction is adjusted to increase or decrease the hardness of the vinegared rice 218, the screw 208 may be loosened to adjust the attachment position of the stopper 204a.

As described above, the vinegared rice 218 is compressed in the widthwise direction and in the vertical direction. Therefore, the vinegared rice 218 is lumped and hardened in the chamber 192, and thus so-called vinegared rice cakes are formed.

Subsequently, when the arm member 196 is rotated in the direction of the arrow J to open the lid member 194, and the compressing operation for the grip section 174 is stopped, then the sliders 154a, 154b are displaced in the direction of the arrow G in accordance with the energizing action of the spring members 158, and the movable plates 186 slide in the direction to make separation from the fixed side plates 148. Thus, the compressing force on the vinegared rice 218 is released.

When the handling section 132 is rotated in the direction of the arrow D as shown by two-dot chain lines in FIG. 13, then the one end of the arm member 130 is raised, and the stand member 120 is raised. Accordingly, the vinegared rice cakes are taken out of the chambers 192. During this process, the stopper 136 is engaged with the engaging hole 140 of the arm member 130, and thus the arm member 130 is held at that position. Therefore, the stand member 120 is held at the raised position, and the vinegared rice cakes can be taken out with ease. The vinegared rice cakes are lumped to have an appropriate hardness. Therefore, the shape of the vinegared rice cake is not collapsed.

In the second embodiment, the plurality of vinegared rice cakes are simultaneously obtained by using the chambers 192 formed as the plurality of individuals. Each of the vinegared rice cakes is formed by lumping and hardening the same amount of the vinegared rice 218 with the same force. Therefore, the vinegared rice cakes are formed to have the same quality as that obtained when a cook makes sushi.

Japanese horseradish (wasabi) is optionally applied to the vinegared rice cake obtained as described above. A seafood topping such as a strip of tuna is placed thereon to complete the shaped sushi.

The boiled rice-shaping apparatus 100 according to the second embodiment is operated manually as described above. Accordingly, it is unnecessary to use any power source such as electricity. Therefore, there is no fear of accident due to electric leakage or the like when the apparatus is used in a kitchen in which water is used. Further, the apparatus has the simple structure. Therefore, any failure scarcely occurs, and it is possible to wash the entire apparatus easily and conveniently.

The first and second embodiments are illustrative of the case in which the shaped sushi is produced. However, the present invention is not limited to these embodiments. It is a matter of course that the present invention is applicable to those produced by lumping and hardening boiled rice to have a predetermined shape, including, for example, rice balls such as onigiri.

What is claimed is:

1. A boiled rice-shaping apparatus comprising:

a bottom section;

a first side plate which is provided in an upstanding manner on said bottom section;

a second side plate which is provided in an upstanding manner on said bottom section and which is capable of making relative approach and separation with respect to said first side plate; and a lid member which is capable of making approach and separation with respect to said bottom section in a direction perpendicular to relative displacement directions of said first side plate and said second side plate, wherein:

boiled rice is charged in a chamber which is formed by said bottom section, said first side plate, and said second side plate, said first side plate and said second side plate are allowed to make approach to one another to press and compress said boiled rice in a widthwise direction, and said lid member is allowed to make approach to said bottom section to press and compress said boiled rice in a vertical direction so that said boiled rice having been shaped to have a predetermined shape is obtained.

2. The boiled rice-shaping apparatus according to claim 1, wherein said first side plate and said second side plate are a first rotatable plate and a second rotatable plate which are adjacent to side portions of said bottom section and which have shaft sections disposed in parallel to one another respectively, and said first rotatable plate and said second rotatable plate are rotated in directions to make approach to one another so that said boiled rice is pressed and compressed in said widthwise direction.

3. The boiled rice-shaping apparatus according to claim 2, wherein said respective shaft sections of said first rotatable plate and said second rotatable plate are provided with gears which are meshed with each other.

4. The boiled rice-shaping apparatus according to claim 2, wherein said lid member is provided on any one of said first rotatable plate and said second rotatable plate, and said lid member is displaceable along said first rotatable plate or said second rotatable plate.

5. The boiled rice-shaping apparatus according to claim 1, wherein a pair of end surface sections, which extend in a direction substantially perpendicular to said first side plate and said second side plate and which are separated from each other by a predetermined spacing distance, are provided in an upstanding manner on said bottom section, and said chamber for charging said boiled rice therein is formed by said bottom section, said first side plate, said second side plate, and said pair of end surface sections.

6. The boiled rice-shaping apparatus according to claim 5, wherein a mold frame, which has a pair of side surface sections formed along side portions of said bottom section, is detachably provided on said bottom section, and said boiled rice is charged in said chamber which is formed by said bottom section, said pair of end surface sections, and said pair of side surface sections.

7. The boiled rice-shaping apparatus according to claim 5, wherein said bottom section is provided as a plurality of individuals, each of said plurality of bottom sections is arranged while being isolated from each other by said end surface sections, and said lid member is provided as a plurality of individuals corresponding to said bottom sections respectively.

8. The boiled rice-shaping apparatus according to claim 1, further comprising:

sliders which are secured to said second side plate, for displacing said second side plate;

a crank mechanism which is provided for said sliders, for converting a displacement direction thereof into a direction perpendicular to a displacement direction of said sliders; and a displacement member for energizing said crank mechanism, wherein:

said crank mechanism is energized by using said displacement member to allow said second side plate to approach said first side plate by the aid of said sliders so that said boiled rice charged in said chamber is pressed in said widthwise direction.

9. The boiled rice-shaping apparatus according to claim 8, wherein said displacement member comprises an adjusting mechanism for adjusting a displacement amount of said displacement member to control hardness of said boiled rice to be shaped by using said adjusting mechanism.

10. The boiled rice-shaping apparatus according to claim 1, wherein said first side plate is a fixed side plate which is secured to an upper portion of said bottom section, and said second side plate is a movable side plate which is capable of making approach and separation with respect to said fixed side plate.

11. The boiled rice-shaping apparatus according to claim 1, further comprising:

a rotatable arm member which is secured to said lid member; and a stopper which is provided on a shaft support member for rotatably supporting said arm member, for regulating a range of rotation of said arm member.

12. The boiled rice-shaping apparatus according to claim 1, further comprising:

a stand member which is provided on said bottom section and which is vertically movable; and a stopper for fastening said stand member at its raised position when said stand member is raised.

* * * * *

UNITED STATES PATENT AND TRADEMARK OFFICE
CERTIFICATE OF CORRECTION

PATENT NO. : 5,910,208
DATED : June 8, 1999
INVENTOR(S) : Hiroshi ONO

It is certified that error appears in the above-identified patent and that said Letters Patent is hereby corrected as shown below:

On title page, insert the following:

Foreign Application Priority Data

May 22, 1998  [JP]  Japan  ............................. 10-141645

Signed and Sealed this

Second Day of November, 1999

Attest:

Q. TODD DICKINSON

Attesting Officer

Acting Commissioner of Patents and Trademarks